July 30, 1957 J. B. SEBOK Re. 24,341

COMBINATION INTAKE SILENCER AND CARBURETOR

Original Filed Nov. 8, 1949 2 Sheets-Sheet 1

Inventor
Joseph B. Sebok
By The Firm of Charles W. Hills
Attys

July 30, 1957 J. B. SEBOK Re. 24,341

COMBINATION INTAKE SILENCER AND CARBURETOR

Original Filed Nov. 8, 1949 2 Sheets-Sheet 2

Inventor
Joseph B. Sebok
The Firm of Charles W. Hills
Attys

By

United States Patent Office

Re. 24,341
Reissued July 30, 1957

24,341

COMBINATION INTAKE SILENCER AND CARBURETOR

Joseph B. Sebok, Dearborn, Mich., assignor to Houdaille Industries, Inc., a corporation of Michigan Original No. 2,681,120, dated June 15, 1954, Serial No. 126,115, November 8, 1949. Application for reissue February 7, 1955, Serial No. 486,745

13 Claims. (Cl. 183—15)

Figure 1:
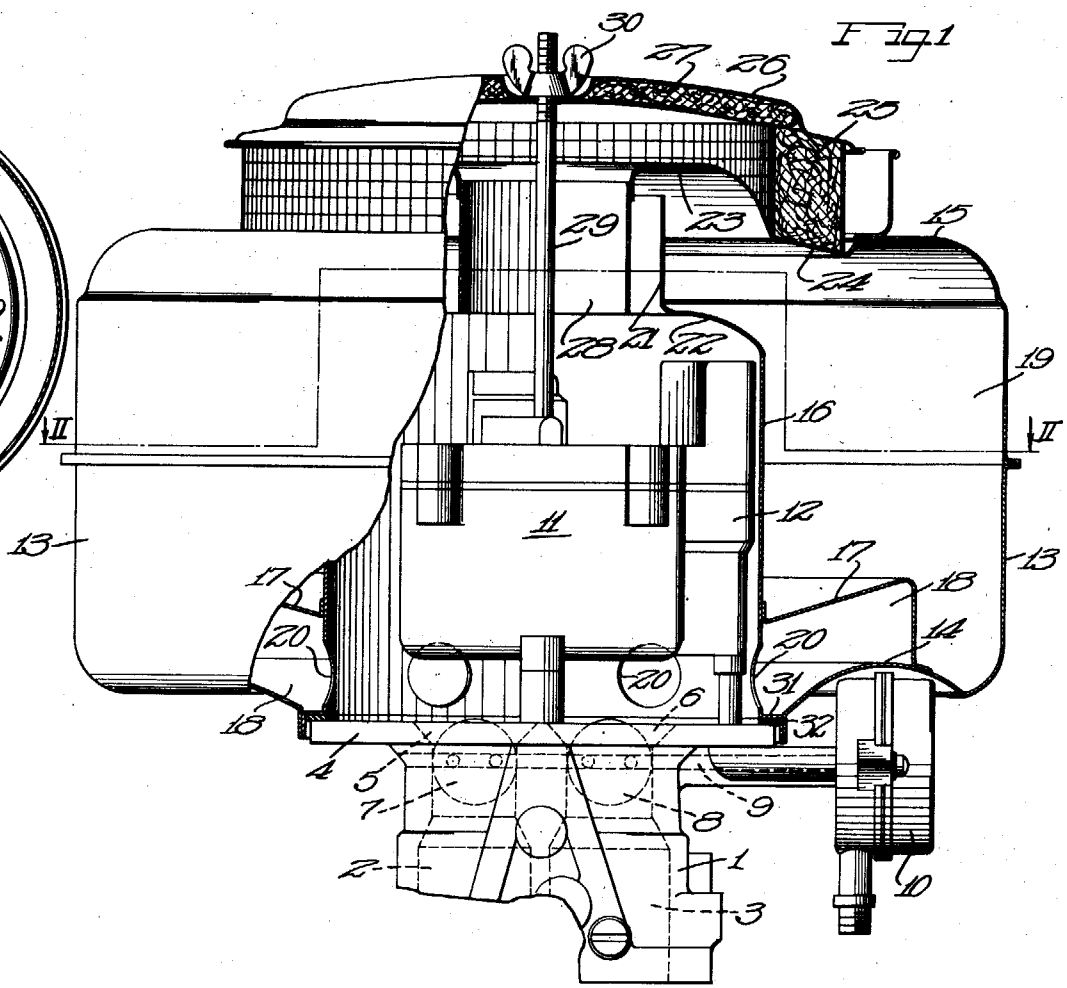

Matter enclosed in heavy brackets [ ] appears in the original patent but forms no part of this reissue specification; matter printed in italics indicates the additions made by reissue.

This invention relates to improvements in a combination air cleaner, intake silencer and carburetor, which is highly desirable for use in connection with internal combustion engines of the automotive type, although the invention will have other uses and purposes as will be apparent to one skilled in the art.

With internal combustion engines utilized on automotive vehicles, it is desirable to provide clean air for the carburetor intake, it is desirable to silence noises emanating from the engine and silencers operating upon the resonator principle have been found *in many cases to be* most satisfactory for this purpose, and it is essential to provide a carburetor to supply the engine with an adequate mixture of air and fuel. In the past, great difficulty has been experienced in placing this equipment beneath the hood of an automobile, and that difficulty has steadily increased with the advant of more powerful engines, and new designs leaving less room beneath the hood. Heretofore it has been the practice to combine the air cleaner and silencer into a single unit, and then connect it to the carburetor by way of adequate coupling means. To provide such a combined air cleaner and silencing unit, with the cleaner of sufficient cubic [feed] *feet* per minute capacity, and with the silencer containing an attenuating chamber or chambers, more than one chamber being required in many instances, and then place that unit beneath the hood of an automobile in proper association with a carburetor, and particularly a downdraft carburetor, is fast becoming an impossibility without providing apparatus that has the appearance of a monstrosity or without separating the cleaner from the silencer and placing this material in odd locations beneath the hood wherever there may be room.

With the foregoing in mind, it is an important object of the instant invention to provide a combination air cleaner, intake silencer and carburetor, an arrangement permitting a cleaner of ample capacity, attenuating chambers of ample volume, as well as the carburetor all neatly disposed beneath the hood of an automobile.

Another object of the invention is the provision of a combination air cleaner, intake silencer, and carburetor wherein a part of the air cleaner and silencer unit forms the necessary casing for the carburetor, and the attenuating chamber or chambers actually surrounds the carburetor.

Still another feature of the instant invention is the provision of a combination air cleaner, intake silencer and carburetor, which construction may embody as many attenuating chambers as desired, and still find room for adequate disposition beneath the hood of an automobile.

It is also a feature of this invention to provide the combination air cleaner, intake silencer and carburetor, which is far more economical than the old separated cleaner and silencer unit and carburetor, by virtue of the fact that the outlet arrangement for the air cleaner performs a triple function of providing a passage for clean air, acting as a wall for the attenuating chamber or chambers, and also functioning as the casing for the carburetor.

The instant invention is further economical in that it eliminates the heretofore utilized carburetor clamp for establishing a connection between an air cleaner or an air cleaner and silencer unit and caurburetor, and is more economical to service because it is far easier to attach and remove, totally or in section, than the previous expedient of taking off the carburetor housing alone.

Still a further feature of the instant invention resides in the provision of a combination air cleaner, intake silencer and carburetor which provides a greatly enhanced appearance, in view of the fact that the casing for the cleaner and silencer covers and conceals most of the carburetor, which heretofore has been an unsightly item.

A further and highly important object of the instant invention is the provision of a combination intake silencer and carburetor, wherein an attenuating chamber of the silencer is brought as close as possible to the source of sound emanating from the carburetor, thereby providing a very definite improvement in silencing ability, because there is no large volume of space through which the sound may spread and be amplified before reaching the silencing chamber as was the case in apparatus of this general character heretofore utilized.

Also an object of the invention resides in the provision of a combination intake silencer and carburetor, wherein the intake silencer is mounted upon the housing support of the carburetor, and the inner wall of an attenuating chamber or chambers, as the case may be, functions as the necessary housing for the carburetor, communication being established between the space inside that wall and the attenuating chamber or chambers.

While some of the more salient features, characteristics and advantages of the instant invention have been above pointed out, others will become apparent from the following disclosures, taken in conjunction with the accompanying drawings, in which—

Figure 2:
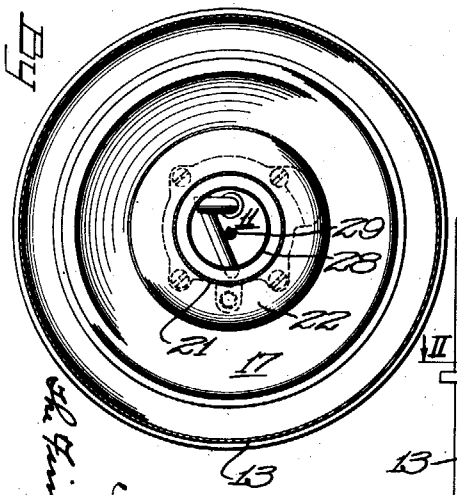
Figure 3:
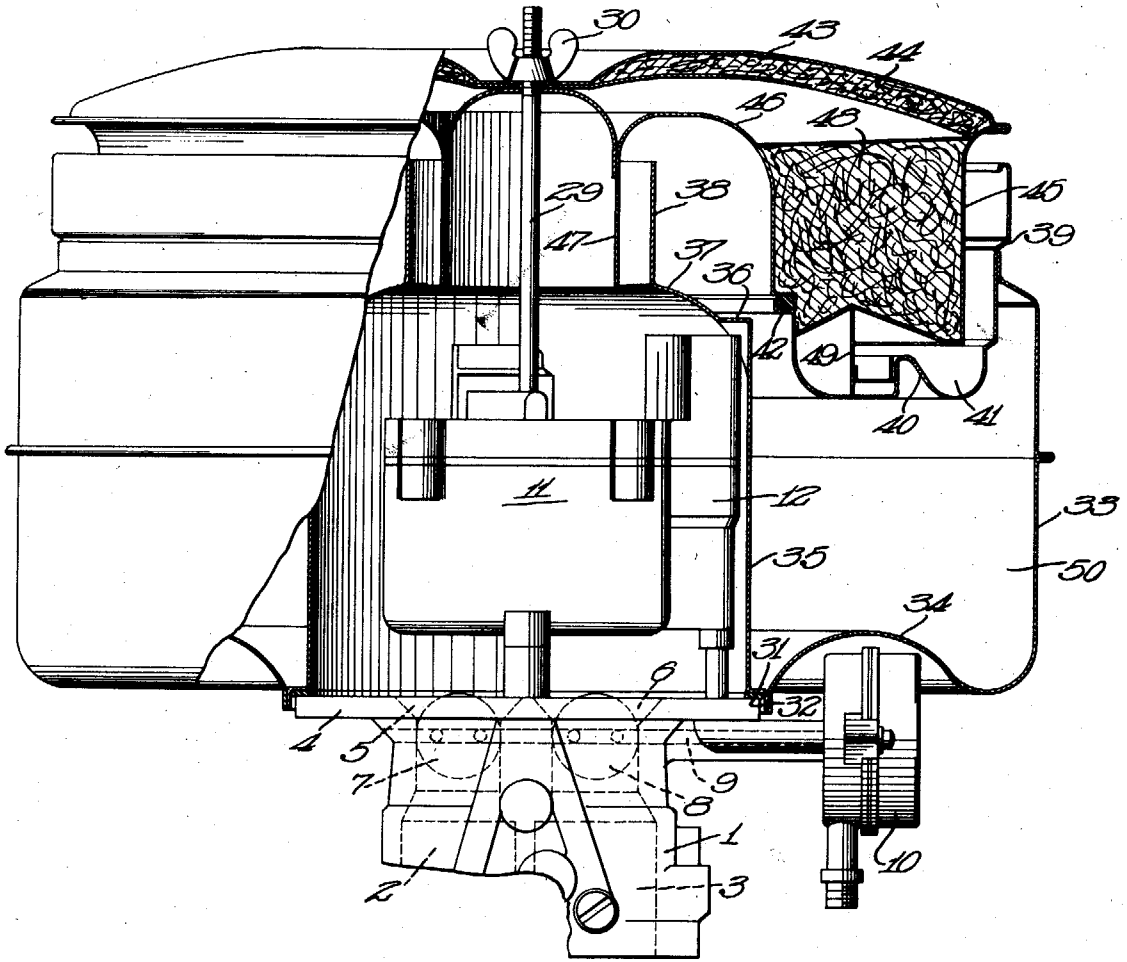

Figure 1 is a side elevational view of a combination air cleaner, intake silencer, and carburetor embodying principles of the instant invention, parts being broken away and parts being shown in section to illustrate the interior construction;

Figure 2 is a reduced plan sectional view of the structure of Fig. 1 taken substantially as indicated by the staggered section line II—II of Fig. 1, looking in the direction of the arrows; and Figure 3 is also a side elevational view of a combination air cleaner, intake silencer and carburetor, with parts broken away and parts in section, in which the air cleaner is of the liquid bath type, and the silencer is of somewhat different construction than the showing in Fig. 1.

As shown on the drawings:

In both illustrated embodiments of the instant invention the same form of downdraft carburetor construction is utilized. In the illustrated instance the carburetor is of a type supplying a V–8 engine where the carburetor has two separate discharge ports, one to each side of the engine. It will be understood, of course, that a carburetor having only a single discharge opening, a single throttle valve, and a single choke valve, may equally as well be utilized, depending upon the character of the engine with which it is associated. Except for those parts particularly salient to the instant invention, the carburetor has been illustrated rather diagrammatically.

The illustrated form of carburetor embodies a base portion 1 which may be connected to an internal combustion engine. Inside that base portion is a pair of adjacent discharge chambers 2 and 3 from which the outflow of the fuel mixture may be controlled by suitable throttle valves, not shown. At the upper part of the base portion is a housing support in the form of a transversely disposed platform 4, ported as at 5 and 6, to admit air and fuel into the chambers 2 and 3. The admission of air through the ports 5 and 6 is governed by a pair of butterfly valves 7 and 8 both mounted on the same shaft 9 which may be controlled by a manually operated choke control, or, as illustrated, by an automatic choke device 10. Above the platform 4 is a suitable structure 11 containing the float chamber from which liquid fuel is delivered to the ports 5 and 6, and a suitable structure 12 containing an accelerating pump. Since in normal operation fuel will travel openly, at least a short distance, in its journey from the float chamber to the ports 5 and 6, it is essential that a housing be provided over the upper portion of the carburetor, which is the major portion of the carburetor. Heretofore a heavy housing was provided on the platform 4, and a suitable connection was made from that housing to an air cleaner or an air cleaner and silencer unit which was most frequently disposed above the carburetor, and where room did not permit, might be disposed to one side of the carburetor. In any event, heretofore, the air cleaner or the air cleaner and silencer unit was separate and apart from the carburetor.

In that embodiment of the invention seen in Figs. 1 and 2, a combination air cleaner and silencer unit is associated with the carburetor, and in this instance the air cleaner is of the so-called dry type. The silencer portion of the structure embodies a fabricated casing including an outer side wall 13, a bottom 14 that is upwardly bowed entirely therearound to provide an inverted channel to receive the aforesaid automatic choke 10 regardless of the position of the cleaner and silencer unit, a top wall 15, and an inside wall 16. An outwardly and then downwardly extending partition 17 is secured to the inside wall 16 and the bottom 14 in the lower portion of the casing. This arrangement provides an attenuating chamber 18 of relatively small volume for higher pitched or higher frequency sounds, and an attenuating chamber 19 of considerably greater volume which should be sized to attenuate the fundamental lower tones developed in the internal combustion engine. *As is well known in this art, an attenuating chamber has a predetermined volume directly related to the wave length or frequency of the sound to be silenced, high frequency sounds having short wave lengths requiring relatively small chamber volumes, while low frequency sounds have longer wave lengths and require commensurately larger chamber volumes.* Entrance is had into the smaller chamber 18 through a series of ports or openings 20 in the extreme lower portion of the inner wall 16. Entrance to the larger chamber 19 is by way of an upright neck portion 21 on the wall 16 after this wall is turned inwardly as at 22 to provide the neck portion of reduced diameter above the carburetor structure. The neck portion 21 is disposed below a raised portion 23 of the top 15 so as to provide a definite path for sound waves therebetween.

The cleaner structure is mounted on top of the silencer structure so that the top of the silencer becomes the bottom of the cleaner. The silencer top 15 is shaped to provide an inclined base 24 for a filter element 25. This element is annular in character and may comprise a mass of filtering material, such as curled cattle tail hair, wavy metallic ribbon, or any other suitable material. The mass is preferably disposed between an inner and outer screen cylinder. Over the filter element 25 and resting thereupon is a cover 26 which contains a hiss silencing pad 27.

Depending from the inner portion of the raised part 23 of the cover is a cylinder 28 leading downwardly from the air cleaner compartment.

With this arrangement, the cover is separable from the filter element, the filter element is separable from the casing, and the entire casing is separable from the carburetor.

The separable portions of the entire structure are held in position by a single bolt 29 secured in the upper portion of the carburetor body structure and extending upwardly through the outlet cylinder 28 and through a suitable aperture in the cover of the cleaner. A wing nut 30 may be engaged with the exterior portion of the bolt 29. In the lower part of the structure it will be noted that the juncture between the inner wall 16 and the bottom 14 is so shaped as to provide a gasket seat 31 under which a gasket 32 is disposed on top of the aforesaid platform 4 of the carburetor. Accordingly, when the wing nut 30 is tightened the casing of the air cleaner and silencer unit is pressed downwardly into intimate association with the gasket 32 so as to establish an air tight seal.

It will be noted that the cylinder 28, while concentric with the cylindrical portion 21 of the inner wall 16 is of less diameter so as to leave a passage between itself and the cylindrical portion 21 for sound waves to enter the large chamber 19. The cylinder 28 together with the inner wall 16 forms the outlet arrangement for the air cleaner, and this outlet arrangement performs a triple function, namely, it provides an outlet for clean air, it provides a wall for the silencing chamber, and it provides the essential housing for the carburetor.

In operation, air by virtue of suction in an internal combustion engine, enters through the filter element 25, descends through the cylindrical outlet 28 and the inner wall 16, so that the only source of air for the carburetor is by way of the outlet arrangement of the air cleaner. The admission of air to the carburetor is of course controlled by the choke valves 7 and 8 in a known manner, during the starting or warm-up period, after which these valves remain open and the admission of air is controlled indirectly by the throttle valves governing the exit of the fuel mixture from the carburetor.

Sound waves leaving the intake manifold of the engine pass through the carburetor, and exit through the ports 5 and 6. Insofar as the present structure is concerned, those ports 5 and 6 may be considered the source of the sound to be attenuated. It is to be especially noted that the ports 20 leading to the high frequency attenuating chamber 18 are preferably immediately adjacent the platform 4 and as close as possible to the sound sources 5 and 6, whereby these high frequency noises are more quickly and positively attenuated because they have no large volume of space through which to travel, spread, and possibly be amplified before reaching the attenuating chamber. Lower frequency sound waves or the heavier fundamental tone of the engine are silenced in the large chamber 19 by passing through the space between the cylinders 28 and 21.

With this arrangement, the entire structure may be easily and readily serviced, including the carburetor, because the entire cleaner and silencer arrangement may be removed from the carburetor, and thus the carburetor housing is removed, by the simple expedient of loosening the wing nut 30.

It will also be especially noted that great economy in production has resulted because the customary carburetor housing has been completely eliminated, and the carburetor clamp formerly used to connect the air cleaner to the carburetor has been completely eliminated.

Further, it will be noted that the major portion of the carburetor is completely encased and concealed, with the outlet arrangement of the air cleaner functioning as the housing for the carburetor, the attenuating chambers completely surround the carburetor and are disposed as close as possible to the source of sound coming from the engine, and the entire structure takes up far less space than any arrangement heretofore provided. With this structure, as many attenuating chambers as desired may be utilized and the air cleaner and attenuating chambers may be sized to adequately accomplish the desired functions with regard to substantially any engine, and still the entire structure may readily be disposed beneath the hood of an automobile.

In Fig. 3 I have illustrated a combination liquid bath air cleaner, intake silencer, and carburetor. The carburetor structure is the same as above described including the securing bolt 29 and the wing nut 30. In this arrangement the air cleaner and silencer unit casing 33 is provided with a bottom portion 34 upwardly bowed to provide an annular groove for the reception of the upper part of the automatic choke 10, and an inner wall 35 corresponding to the previously described inner wall 16. This wall 35 is offset at 36 to avoid contact with the upper portion of the pump structure 12 of the carburetor, curved inwardly as at 37, and terminates in an upwardly extending cylindrical portion 38 corresponding to the previously described portion 21.

Over the top of the silencer casing is an air cleaner structure embodying a side wall 39, a bottom 40 shaped to define a liquid sump 41 therein and which bottom terminates in a support for a gasket 42 at the inner side thereof. A cover 43 provided with a hiss silencing pad 44 is interlocked with a filter holding shell comprising an outer wall 45 and an inner wall 46 which curves upwardly and inwardly to join a cylindrical outlet conduit 47, concentric with the part 38 of the inner silencer wall 35 but of smaller diameter to leave a communicating passage therebetween. The filter holding shell contains a filter mass 48 of any suitable filtering material, and a deflector element 49 may be disposed in the liquid sump below that filter mass. The provision of the air cleaner arrangement above described in cooperation with the silencer casing 33 defines a large sound attenuating chamber 50 into which sound waves may enter through the space between the cylindrical conduit portions 47 and 48, in the manner previously described. *This chamber 50, as clearly seen in Figure 3, in effect surrounds all but the top of the air cleaner structure, and extends upwardly inside the inner wall 46 of the filter holding shell, underneath the liquid sump, and upwardly around the outside of the filter shell.*

In this instance, also, the single bolt 29 and wing nut 30 hold the separable parts togeter and in proper position over the carburetor. The outlet arrangement from the air cleaner including the conduit 47 and the inner silencer wall 35 provides the essential housing for the carburetor, all as previously described. When the nut 30 is released, the cover together with the filter element may be removed, and then the entire silencer structure including the liquid sump of the air cleaner arrangement may be litfed off the carburetor as desired.

The operation of this structure is substantially the same as previously described, except in this instance I have illustrated only one large fundamental tone attenuating chamber. Air enters between the casing 39 and the adjacent filter shell wall 45, descends to commingle with sump liquid, passes upwardly through the filter mass, and then enters the region defined by the inner silencer wall 35 around the carburetor.

It will be understood that modifications and variations may be effected without departing from the scope of the novel concepts of the present invention.

I claim as my invention:

1. In combination, a carburetor embodying mechanism for developing a fuel and air mixture and a housing support at a relatively low location, parts of said mechanism being unenclosed by carburetor structure, and an intake silencer comprising a casing including an outer wall, a top, a bottom having an opening therein, and an inner wall around said opening and spaced from said outer wall to enclose a sound attenuating chamber operable upon the resonator principle and to which access for sound waves is had through the inner wall, said casing being seated upon said housing support with the inner wall enclosing parts of the carburetor above said support, and means in said casing defining a path for incoming air leading into said inner wall and separate and apart from said attenuating chamber.

2. In combination, a carburetor embodying mechanism for developing a fuel and air mixture and a housing support at a relatively low location, parts of said mechanism being unenclosed by carburetor structure, and an intake silencer comprising inner and outer walls, means therebetween enclosing a sound attenuating chamber operating on the resonator principle, means defining a path for air from outside said casing into said inner wall and said path being separate from said attenuating chamber, said casing being seated on said support with said inner wall enclosing parts of the carburetor mechanism above the support, and said inner wall having an opening therein adjacent said support to said attenuating chamber.

3. In combination, a carburetor embodying mechanism for developing a fuel and air mixture and a housing support at a relatively low location, parts of said mechanism being unenclosed by carburetor structure, and an intake silencer comprising inner and outer walls, means therebetween enclosing a sound attenuating chamber operating on the resonator principle, means defining a path for air from outside said casing into said inner wall and said path being separate from said attenuating chamber, said casing being seated on said support with said inner wall enclosing parts of the carburetor mechanism above the support, said attenuating chamber being disposed around the parts of the carburetor above said support and access for sound waves to the attenuating chamber being had through said inner wall.

4. An intake silencer for use with a carburetor having carburetting parts unenclosed by carburetor structure above a housing support, said silencer including a casing having spaced inner and outer walls, means between said walls defining an annular attenuating chamber around said inner wall and to which access is had through an opening in said inner wall, said attenuating chamber operating upon the resonator principle, said casing being arranged to seat upon the housing support of the carburetor with said inner wall enclosing the carburetting parts above the housing support, said casing having an air inlet, and means defining a path for incoming air from said inlet into said inner wall which path is separate and apart from said attenuating chamber.

5. In combination, a carburetor having a support at a relatively low location, and an intake silencer seated on said support, said silencer including spaced inner and outer walls of which the inner wall encloses the carburetor above said support, means between said walls defining an attenuating chamber operable upon the resonator principle and surrounding said inner wall, said inner wall having an opening therein for sound waves to enter the attenuating chamber, and means in said silencer to guide outside air into said inner wall along a path separate from said attenuating chamber.

6. In combination, a carburetor having a support at a relatively low location, and an intake silencer seated on said support, said silencer including spaced inner and outer walls of which the inner wall encloses the carburetor above said support, means between said walls defining an attenuating chamber operable upon the resonator principle and surrounding said inner wall, said inner wall having an opening therein for sound waves to enter the attenuating chamber, and means in said silencer to guide outside air into said inner wall along a path separate from said attenuating chamber, the fuel discharge port from the carburetor being adjacent the plane of said support and unenclosed except by said inner wall, and the opening in said inner wall to the attenuating chamber being adjacent said support.

7. *An intake silencer for use with a carburetor having carburetting parts unenclosed by carburetor structure above a housing support, said silencer including a casing having spaced inner and outer walls with an annular sound attenuating chamber between said walls around*

*said inner wall, the casing being constructed to give said chamber a predetermined volume in relation to a sound wave of predetermined length, said casing being arranged to seat on the housing support of the carburetor with said inner wall enclosing the carburetting parts above the housing support, said casing having an air inlet, and means in said casing defining a path of travel for air from said inlet to the inside of said inner wall.*

*8. A combination air cleaner and carburetor silencing unit for use with a carburetor having carburetting parts unenclosed by carburetor housing structure above a housing support, said unit including a casing having inner, outer and bottom walls with an annular sound attenuating chamber between said inner and outer walls and around said inner wall, the casing being constructed to give said chamber a predetermined volume in relation to a sound wave of predetermined length, air cleaning means in said casing extending downwardly into said chamber and having an outlet for cleaned air communicating with the interior of said inner wall, said casing being open at the bottom inside said inner wall and arranged to seat on housing support of the carburetor with said inner wall enclosing the carburetting parts above that housing support, a cover for said casing, said casing having an air inlet, and means in said casing defining a path of travel from said air inlet through said air cleaning means.*

*9. In combination in an oil bath air cleaner, casing means defining a liquid sump space, casing means defining an annular filter mass positioned above said sump space, said casing means defining an air inlet to said sump space, outlet conduit defining means positioned to discharge cleaned air from said cleaner, a filter mass shaped to define a cavity within itself, and a silencer positioned in part within the projected area of said filter mass, a substantial portion of said silencer extending into the cavity within said filter mass, and a portion of said silencer surrounding said filter mass, and a portion of said silencer lying below said sump space.*

*10. In combination in an oil bath air cleaner, casing means defining a liquid sump space, casing means defining an annular filter mass positioned above said sump space, said casing means defining an air inlet to said sump space, outlet conduit defining means positioned to discharge cleaned air from said cleaner, a filter mass shaped to define a cavity within itself, and a silencer positioned in part within the projected area of said filter mass, a substantial portion of said silencer extending into the cavity within said filter mass and lying above the bottom and below the top of said filter mass, and a portion of said silencer surrounding said filter mass, and a portion of said silencer lying below said sump space.*

*11. In combination in an oil bath air cleaner, casing means defining a liquid sump space, casing means defining an annular filter mass positioned above said sump space, said two casing means defining together an annular air inlet to said sump space outlet, conduit means positioned to discharge cleaned air from said cleaner, a filter mass shaped to define a cavity within itself and a silencer positioned in part within said cavity and in part outside of both said casing means, and in part beneath said filter mass, said liquid sump space and both said casing means.*

*12. In combination in an air cleaner, casing means having an air inlet and defining a support for an air filter, an annular air filter on said support, outlet conduit defining means positioned to discharge cleaned air from said filter and casing, said annular air filter being shaped to define a cavity within itself, and a silencer positioned in part within the projected area of said air filter, a substantial portion of said silencer extending within said filter and a portion of said silencer surrounding said filter, and a portion of said silencer lying below said annular filter.*

*13. An air cleaner and intake silencer assembly for use with a carburetor having carburetting parts unenclosed by carburetor structure above a housing support, said assembly including a casing having an air inlet and a support for air filtering means, an annular air filter on said support, said casing having a bottom opening therein and arranged to seat on the carburetor housing support around said bottom opening and enclose the carburetting parts above the housing support, said casing enclosing a sound attenuating chamber around the carburetting parts above said housing support, said casing being constructed to give said chamber a predetermined volume in relation to a sound wave of predetermined length, and means carried by said casing defining a path of travel for air from said inlet through said filter and toward the casing bottom opening.*

References Cited in the file of this patent or the original patent

UNITED STATES PATENTS

| | | |
|---|---|---|
| 1,945,180 | Carter | Jan. 30, 1934 |
| 2,064,207 | Jacobs | Dec. 15, 1936 |
| 2,126,643 | Kamrath | Aug. 9, 1938 |

FOREIGN PATENTS

| | | |
|---|---|---|
| 880,587 | France | Jan. 4, 1943 |